United States Patent [19]

Kobayashi et al.

[11] Patent Number: 4,981,361
[45] Date of Patent: Jan. 1, 1991

[54] COLOR COMPARISON DEVICE HAVING A COLOR SAMPLE-BONDING WHEEL WHICH PERMITS EASY REMOVAL OF A COLOR SAMPLE STICKER

[75] Inventors: Toshiyuki Kobayashi; Shigeru Makita, both of Kyoto; Hiroyuki Ota, Osaka, all of Japan

[73] Assignee: Omron Tataesi Electronics Co., Kyoto, Japan

[21] Appl. No.: 317,831

[22] Filed: Feb. 28, 1989

[30] Foreign Application Priority Data

Mar. 3, 1988 [JP] Japan .................. 63-28435[U]

[51] Int. Cl.⁵ .................................................. G01J 3/52
[52] U.S. Cl. ........................................ 356/423; 356/42
[58] Field of Search ................... 356/40, 42, 421–424, 356/243

[56] References Cited

U.S. PATENT DOCUMENTS 3,009,388 11/1961 Polanyi ........................... 356/40
4,682,891 7/1987 de Macario et al. ............. 356/246
4,871,258 10/1989 Herpichboehm et al. ........ 356/423

FOREIGN PATENT DOCUMENTS 549347 11/1942 United Kingdom ............. 356/423

Primary Examiner—F. L. Evans
Attorney, Agent, or Firm—Dickstein, Shapiro & Morin

[57] ABSTRACT

A color comparison device uses a rotatable color sample-bonding wheel to hold a sticker containing a plurality of color shades for matching with a color of a test portion of a test stick as the wheel rotates. At least one recess is formed in a part of the sticker bonding surface of the wheel to permit access to an edge of the sticker to facilitate its removal from the wheel.

4 Claims, 3 Drawing Sheets

COLOR COMPARISON DEVICE HAVING A COLOR SAMPLE-BONDING WHEEL WHICH PERMITS EASY REMOVAL OF A COLOR SAMPLE STICKER

BACKGROUND OF THE INVENTION

1. Field of the Invention

This invention relates generally to a test sample color comparison device for use in biochemical examinations (blood sugar, urine sugar, urobilin and other such examinations), and more particularly to a wheel of such a device to which a color sample is adapted to be bonded so that the color sample on the wheel can be compared with a test paper impregnated, for example, with blood as the wheel is rotated relative to the test paper. The color sample which best matches the color of the test paper provides an indication of a characteristic of the impregnating material, e.g., blood.

2. Discussion of Related Art

Japanese Patent Application No. 282780/87 and U.S. patent application Ser. No. 268,561 filed Nov. 8, 1988 disclose a test sample color comparison device which is compact in size and enables an easy and rapid measurement of body chemistry such as the amount of blood sugar, urine sugar or the like.

FIG. 4 is an exploded perspective view of the test sample color comparison device disclosed in the above applications which comprises a casing unit 1 housing a CPU (central processing unit) and other electronic circuits, a wheel 6 which is fitted on the casing unit 1 and has a color sample section 3 for holding a color sample (which may be in the form of a sticker) at an upper surface thereof and an uneven patterned code section (uneven patterned code plate) 6a at the underside thereof, and a cover unit 4 fitted on the casing unit 1. The casing unit 1 has an insertion section 11 for removably receiving a color test portion of a test stick, and a protruding display section 12 for displaying the results of the color comparison. The wheel 6 is rotatably fitted on the protruding display section 12 of the casing unit 1, and the wheel 6 is so arranged that the comparison color sample section 3 having different staged reference color shades 1, 2, 3, 4, 5, 6 7 and 8 arranged in a circular array on the upper surface thereof can be viewed through a display window 41 formed through the cover unit 4. A plurality of converter switches $K_1$, $K_2$, $K_3$ and $K_4$ are mounted on the casing unit 1 independently of one another and disposed in corresponding relation to the wheel 6 (the uneven patterned code plate 6a), so that these switches can convert the results of a visual comparison between the color comparison sample section 3 and the color test portion to electrical signals. The uneven patterned code plate 6a integrally mounted on the underside of the wheel 6 has an uneven pattern defined by thickened portions and thinned portions, and this uneven pattern operates or turn on or off the converter switches $K_1$, $K_2$, $K_3$ and $K_4$ in accordance with the rotation of the wheel 6.

In the above color comparison device, the color test portion of the test stick is inserted into the insertion section 11, and the wheel 6 is rotated to visually compare the color of the test portion with the reference color shades on the color sample section 3. Then, when one of these reference color shades coincides with the color test portion, the wheel 6 is stopped in that position, and a start switch is turned on. As a result, the position of the wheel 6 and therefore the color are identified in accordance with the states (ON or OFF) of the converter switches $K_1$, $K_2$, $K_3$ and $K_4$, so that corresponding measurement data are read out through the eelectronic circuits and are displaced on the display section 12.

In the above test sample color comparison device, the color test portion of the test stick is disposed over the color sample section 3 of the wheel 6. Therefore, as measurements are conducted over and over again, blood or urine impregnated in the test portion is transferred to the color sample section 3 to stain it. Therefore, it is necessary to replace the color sample section with a new one once in a while. Further, the test sticks are sold in the form that a predetermined number of (for example, 50, 100 or 300) tests sticks are contained in a bottle, a can or the like. These bottles or cans of test sticks have different properties, and therefore different color sample labels are attached to the different bottles or cans, respectively. Therefore, each time a different bottle or can of test sticks is used, the color sample section 3 is exchanged. However, since the color sample section 3 is typically in the form of a sticker which is adhesively bonded to a groove portion 6d formed between inner and outer circumferential protrusions 6b and 6c formed on the upper surface of the wheel 6, the color sample sticker 3, once bonded to the groove portion 6d, cannot easily be peeled therefrom. Thus, the problem is that the exchange of color sample stickers takes considerable time and labor.

SUMMARY OF THE INVENTION

In an effort to overcome these problems, it is an object of this invention to provide a color sample-bonding wheel for color comparison devices in which a color sample sticker can be easily peeled from the wheel, so that the exchange of color sample stickers requires less time and labor.

According to the present invention, there is provided a color comparison device comprising an insertion portion for removably receiving a color test portion of a test stick; a color sample-bonding wheel which is rotatable relative to the insertion portion to permit alignment of a color shade on the wheel with the color test portion of the insertion stick as the wheel is rotated relative to the test stick; a sticker which has a color sample having a plurality of staged color shades and which is bonded to an upper surface of the wheel at a circumferential portion of the wheel, whereby the color test portion residing in the insertion portion is compared with the color sample shades as the wheel is rotated; and, a recess formed in at least part of at least one of the outer periphery and the inner periphery of the sticker-bonding surface of the wheel to permit access to an edge of the sticker to facilitate its removal from the wheel.

In the color sample-bonding wheel, a gap is formed at the recess area between the wheel and the color sample sticker when the color sample sticker is bonded to the upper surface of the wheel, since the recess is formed in at least part of the outer periphery or the inner periphery of the color sample bonding surface of the wheel. Therefore, the color sample sticker can be easily peeled off by engaging a finger, or a forceps or the like with the color sample sticker.

BRIEF DESCRIPTION OF THE DRAWINGS

The invention and the various objects, advantages and features thereof will be better understood from the following detailed description which is provided in connection with the following drawings wherein.

DETAILED DESCRIPTION OF THE INVENTION

The invention will now be described in further detail by way of a preferred embodiment thereof.

Figure 1A:
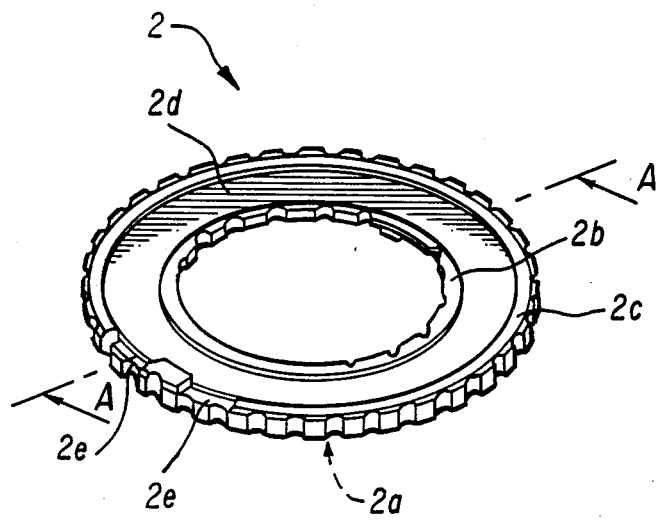
FIGS. 1A and 1B are perspective views of alternate embodiments of a color sample-bonding wheel for a color comparison device provided in accordance withe the present invention.
Figure 2:
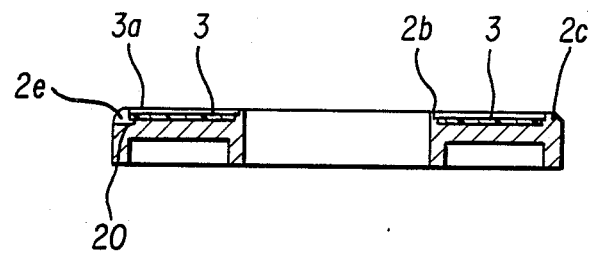
FIG. 2 is a cross-sectional view of the color sample-bonding wheel taken along the line A—A of FIG. 1A.

Fig. 1A is a perspective view of a preferred embodiment of a color sample-bonding wheel of the present invention for use in a color comparison device. FIG. 2 is a cross-sectional view taken along the line A—A of FIG. 1A. The color sample-bonding wheel 2 in this embodiment can be used instead of the wheel 6 shown in FIG. 4.

Figure 3:
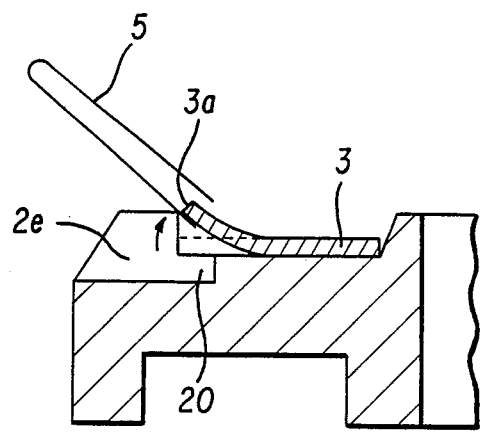
FIG. 3 is an enlarged view of an outer peripheral portion of the color sample-bonding wheel.

However, in the wheel 2 of this embodiment, part of the outer circumferential protrusion 2c is cut away, and also the groove portion 2d is cut away radially inwardly adjacent to those cut-away portions of the outer circumferential protrusion 2c to provide recesses 2e. With this arrangement, when the color sample sticker 3 is bonded to the groove portion 2d, an outer peripheral portion or edge 3a of the color sample sticker 3 projects into the recesses 2e in overlying relation thereto, so that a gap 20 is formed between the color sample sticker 3 and the bottom of each recess 2e. For peeling off the color sample sticker 3, a forceps 5 (or a finger) is inserted into one of the recesses 2e to engage with the outer peripheral portion 3a of the color sample sticker 3, so that the color sample sticker can be easily peeled off (see FIG. 3).

Figure 1B:
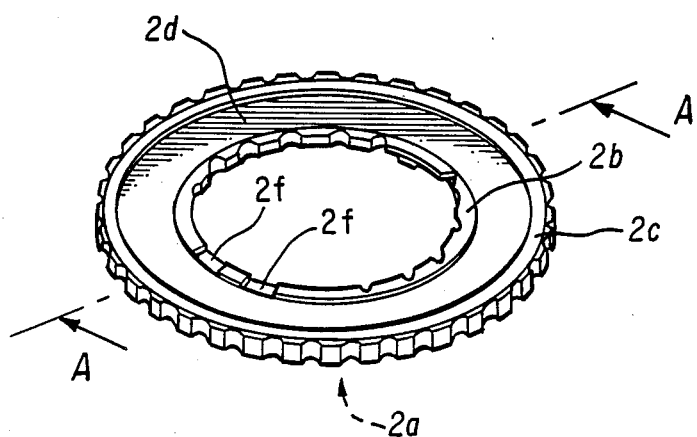

As shown in FIG. 1A, two recesses 2e are used however a single recess or a number of recesses greater than two can be used. Also, the recesses shown are formed by cutting an outer circumferential protrusion 2c and the groove portion 2d. As shown in FIG. 1B the recesses can be formed by cutting out the inner circumferential protrusion 2b and an adjacent portion of the groove portion 2d can be cut away radially outwardly as shown by recesses 2f.

Figure 4:
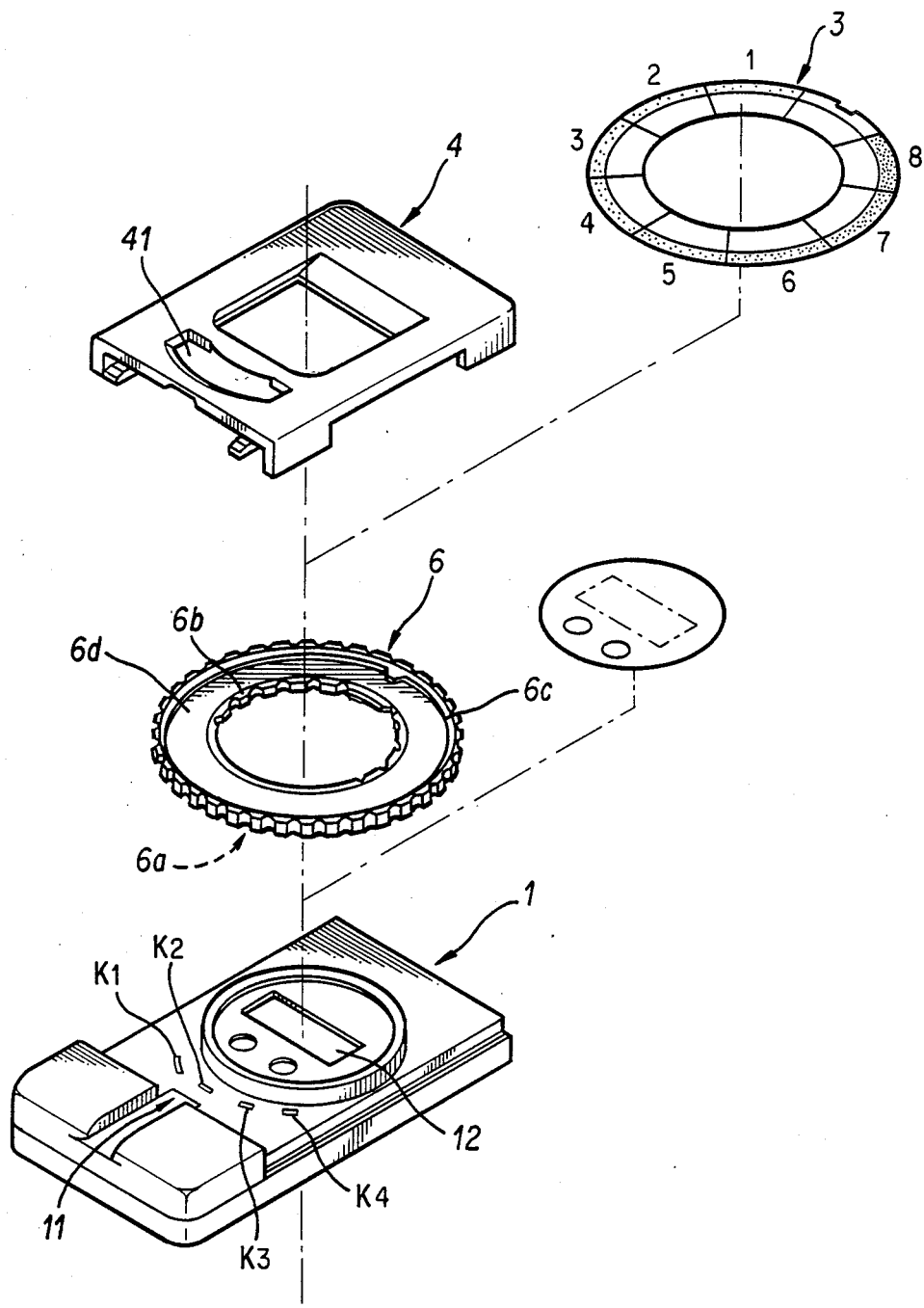
FIG. 4 is an exploded perspective view of a color comparison device upon which the invention improves.

In the above embodiment, the color sample-bonding wheel is of such a construction that it has the integral code plate for operating or turning on or off the switches $K_1$, $K_2$, $K_3$ and $K_4$ shown in FIG. 4, however, the invention is not to be restricted to such an embodiment. For example, the invention can be applied to a color comparison device of a simpler construction in which a test portion of a test stick inserted in an insertion portion of the color comparison device is merely compared with the color sample.

According to the present invention, the recesses are formed in at least part of the outer periphery or the inner periphery of the color sample-bonding surface of the wheel. Therefore, the gap is provided between the wheel and the bonded color sample sticker at the position where each recess is provided. The color sample sticker can be easily peeled off by bringing the finger or a tool like a forceps into the recess and engage it with the color sample sticker. Thus, the exchange of color sample stickers can be made more easily than before.

Although a preferred embodiment of the invention has been described and illustrated, it should be apparent that modifications can be made to the invention without departing from the spirit or scope thereof. Accordingly, the invention is not limited to the foregoing description but is only limited by the scope of the appended claims.

We claim:

1. A color comparison device comprising:
    an insertion portion for removably receiving a color test portion of a test stick;
    a color sample-bonding wheel mounted to be rotatable relative to said insertion portion;
    a sticker which has a color sample having a plurality of staged color shades bonded to an upper surface of said wheel at a circumferential portion thereof whereby said color test portion in said insertion portion can be compared with the color shades of said color sample as said wheel rotates; and
    at least one recess formed in at least part of at least one of an outer periphery and the inner periphery of the sticker bonding surface of said wheel to permit access to an edge of said sticker to facilitate its removal from said wheel.

2. A color comparison device as in claim 1 wherein said wheel has circumferential protrusions formed on an upper surface thereof at inner and outer peripheries, and a flat ring area between said protrusions, said at least one recess being formed by a cutout of a part of one of said protrusions and a cutout of a part of said flat ring area adjacent said protrusion cutout.

3. A color comparison device as in claim 1 wherein a plurality of recesses are formed in said wheel.

4. A color comparison device as in claim 2 wherein a plurality of recesses are formed in said wheel.

* * * * *